United States Patent [19]
Witter

[11] Patent Number: 5,746,795
[45] Date of Patent: May 5, 1998

[54] REPLACEABLE, SELF-CLEANING CARTRIDGE FOR A CYCLONIC AIR CLEANING DEVICE

[76] Inventor: Robert Witter, 150 Robineau Rd., Syracuse, N.Y. 13207

[21] Appl. No.: 574,305

[22] Filed: Dec. 18, 1995

[51] Int. Cl.⁶ ................................................. B01D 45/12
[52] U.S. Cl. ...................... 55/472; 55/337; 55/429; 55/457; 55/459.3; 55/473; 55/498
[58] Field of Search ........................... 55/332, 337, 385.3, 55/429, 459.1, 459.3, 457, 473, 472, 498, 461, 348; 34/235

[56] References Cited

U.S. PATENT DOCUMENTS

| | | |
|---|---|---|
| 418,834 | 1/1890 | Allington et al. . |
| 2,687,782 | 8/1954 | Sonderegger . |
| 2,790,554 | 4/1957 | Work . |
| 3,048,959 | 8/1962 | Lowther . |
| 3,902,876 | 9/1975 | Moen et al. ............... 55/348 |
| 3,953,184 | 4/1976 | Stockford et al. . |
| 4,081,915 | 4/1978 | Bablerowicz et al. ............... 34/235 |
| 4,178,248 | 12/1979 | Porter et al. . |
| 4,265,640 | 5/1981 | Bielefeldt . |
| 4,336,040 | 6/1982 | Haberl ............... 55/429 |
| 4,406,677 | 9/1983 | Obermeier . |
| 4,469,084 | 9/1984 | Gillotti ............... 55/473 |
| 4,670,161 | 6/1987 | Hayatdayoudi . |
| 4,889,544 | 12/1989 | Hsu ............... 55/337 |
| 4,944,780 | 7/1990 | Usmani ............... 55/337 |
| 5,053,126 | 10/1991 | Krasnoff . |
| 5,066,315 | 11/1991 | Haberl et al. ............... 55/337 |
| 5,123,945 | 6/1992 | Lin ............... 55/429 |
| 5,192,423 | 3/1993 | Duczmal et al. . |
| 5,228,890 | 7/1993 | Soderlund et al. . |
| 5,273,665 | 12/1993 | White . |
| 5,352,256 | 10/1994 | Stead et al. ............... 55/337 |
| 5,435,817 | 7/1995 | Davis et al. ............... 55/459.3 |

*Primary Examiner*—Jay H. Woo
*Assistant Examiner*—Minh-Chau T. Pham
*Attorney, Agent, or Firm*—George R. McGuire

[57] ABSTRACT

The present invention provides a cyclonic air cleaning device having a self cleaning, replaceable cartridge filter. The device essentially includes a barrel having a vortex tube concentrically positioned therein and a cylindrical, pleated filter cartridge concentrically positioned within the vortex tube, and a cone portion removably attached to and extending downwardly from the bottom of the barrel. The cone funnels debris to a collection receptacle securely attached to the bottom thereof. The filter is held in place by an upper plate fixedly secured to the vortex tube, a lower plate, and a T-bar extending centrally through the two plates and filter. A wing nut engages the bottom end of the T-bar in abutting relation to the bottom plate to hold the filter in place.

25 Claims, 7 Drawing Sheets

REPLACEABLE, SELF-CLEANING CARTRIDGE FOR A CYCLONIC AIR CLEANING DEVICE

BACKGROUND OF THE INVENTION

The present invention generally relates to air cleaning systems, and more particularly to cyclonic air cleaners employing a replaceable, self-cleaning cartridge.

Factories, home workshops, and other operations utilizing wood cutting or some other kind of debris producing machinery generally need air cleaning systems incorporated therein to ensure safe working conditions, as well as abide by certain governmental regulations. Typically, each debris producing machine has a vacuum source attached thereto which sucks the debris, i.e., woodchips, produced by the machine through a conduit and eventually to an air filtering device. The air filter device filters out all debris above a predetermined size and either recycles the clean air or simply emits it into the outside atmosphere. The filtered debris is generally collected in a silo or other waste collecting receptacle for proper dispensing thereof.

One type of filtering device often used is a cyclonic air cleaner. In a cyclonic air cleaner, debris laden air is tangentially introduced into a vertically oriented barrel via a conduit, where it spirals upwardly around a cylindrical filter concentrically positioned within the barrel. Open space exists between the barrel and filter, with the ceiling of that open space being closed by a metal plate and the bottom being left open. The top of the filter is open and leads to either the atmosphere or a conduit to direct the air passing therethrough to a predetermined location. The filter's bottom is, likewise, left open. Debris falling through the open bottom of the barrel funnels into a receptacle. A blower unit positioned near the exit or entranceway to the barrel creates the airflow via physics principles of negative or positive pressure, respectively.

After a predetermined amount of debris has been collected in the filter, its cleaning efficiency will start decreasing, and the filter must be replaced. With the prior art devices, changing the filter is a time-consuming, complicated process. Typically, the heavy exit conduit must be detached from the top of the cyclone filter, and then the filter arrangement must be disassembled. Once disassembled, the filter can be removed and a new one placed therein. The heavy conduits could then be properly re-affixed to the filter unit. This process often results in inefficient suction as the conduit's seals with the filter unit are sometimes broken. After continually changing the filter, the system would become more and more inefficient because of poor connections or fractured parts.

It is therefore a principal object of the present invention to provide a cyclonic air cleaning device having a filter which is easily changeable.

It is another object of the present invention to provide a cyclonic air cleaning device which is inexpensive to manufacture.

Other objects and advantages of the present invention will in part be obvious and in part appear hereinafter.

SUMMARY OF THE INVENTION

In accordance with the foregoing objects and advantages, the present invention provides a cyclonic air cleaning device having a self-cleaning, replaceable filter. The device is essentially comprised of a barrel having a vortex tube concentrically positioned therein and a cylindrical, pleated filter cartridge concentrically positioned within the vortex tube, and a cone portion removably attached to and extending downwardly from the bottom of the barrel. The cone funnels debris to a collection receptacle securely attached to the bottom thereof. The device also includes an inlet conduit and an outlet.

Open space exists between the barrel and the vortex tube/filter cartridge arrangement, wherein the debris laden air tangentially introduced into the device from the inlet conduit spirals into the vortex tube and upwardly around the filter cartridge. A metal flange extending radially outward from the vortex tube to the barrel, and positioned in the open space adjacent the top of the barrel prohibits air from exiting the device without passing through the filter. By forcing the debris laden air to pass through the filter ensures that all particulate matter above a predetermined size is filtered out. Thus, the air that makes it through the filter cartridge is clean and is free to pass through the outlet which extends through the barrel's sidewall near the top thereof. Heavier particles present in the air may simply fall out of the air stream before being forced out by the filter cartridge. The filtered particles will fall through the open bottom of the barrel, into the cone, and eventually into the collection receptacle.

A fan positioned at the uppermost point in the barrel portion provides the negative pressure which creates the air stream and vacuum force for conveying the debris laden air from its source, and through the filter. The clean air is then forced through the outlet into the open atmosphere. The system would operate just as well under positive pressure with the fan positioned in the inlet conduit.

Changing the filter cartridge when necessary is easily done. The cone is connected to the barrel by a belt-like clamp having one release screw. By removing the release screw, the cone detaches from the barrel, and the cartridge filter is accessible near the bottom of the barrel. The filter is held in place within the barrel by two plates, one positioned on each end of the filter, and a threaded T-bar extending downwardly through the filter. A wing nut engages the lower end of the shaft, thereby securely holding the bottom plate, and thus the filter, in place. Removal of the wing nut causes, the lower plate, filter, and upper plate to fall out of the barrel. A new filter can then be slid into the barrel, with the upper and lower plates positioned in abutting relation to the new filter, and the T-bar's shaft passing therethrough. The wing nut may then be threaded onto the T-bar's shaft to securely hold the filter assembly in position. The cone is then reattached to the barrel by appropriately positioning the cone with respect to the barrel, and replacing the release screw in the belt clamp to secure the cone and barrel together.

BRIEF DESCRIPTION OF THE DRAWINGS

The present invention will further be described by reference to the drawing figures, wherein.

DETAILED DESCRIPTION

Figure 1:
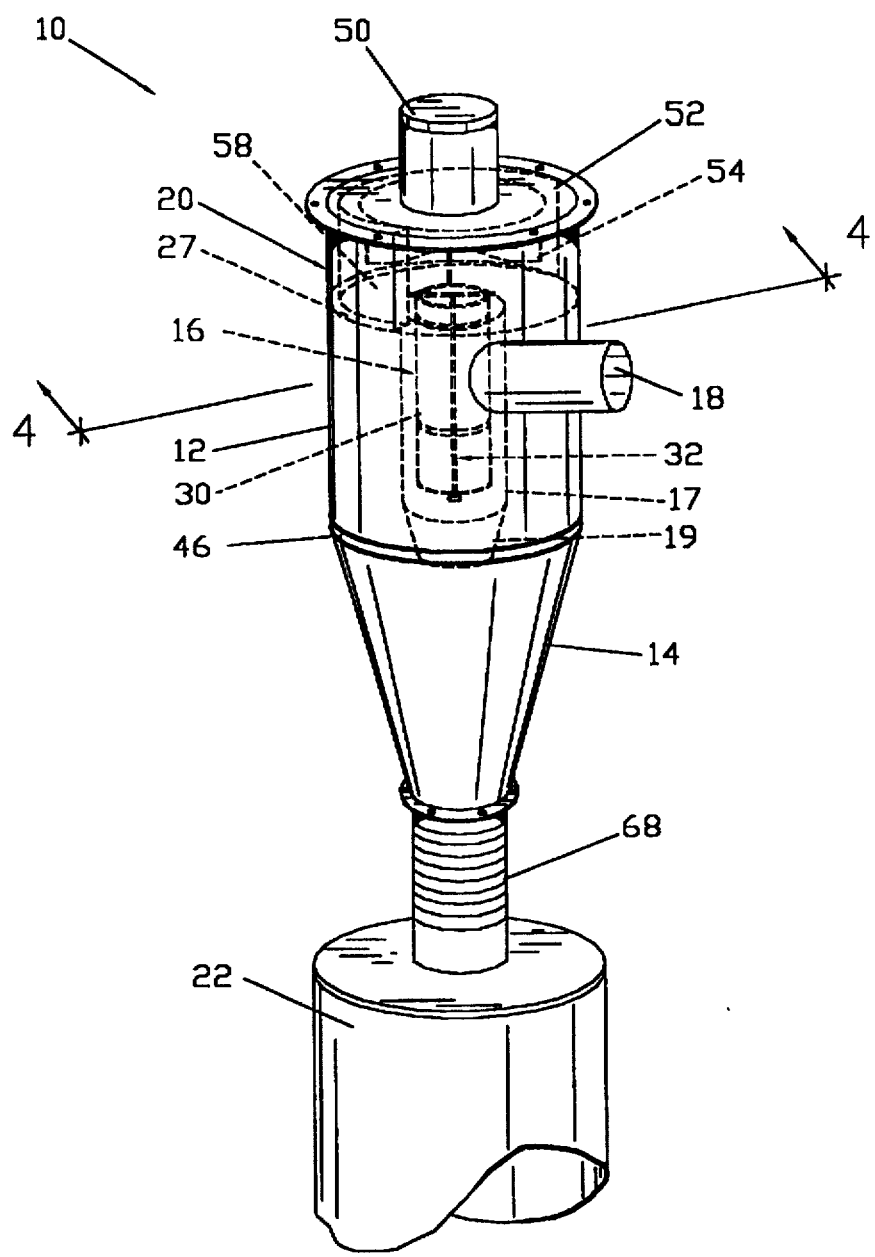
FIG. 1 is a perspective view of a cyclonic air cleaning device.
Figure 2:
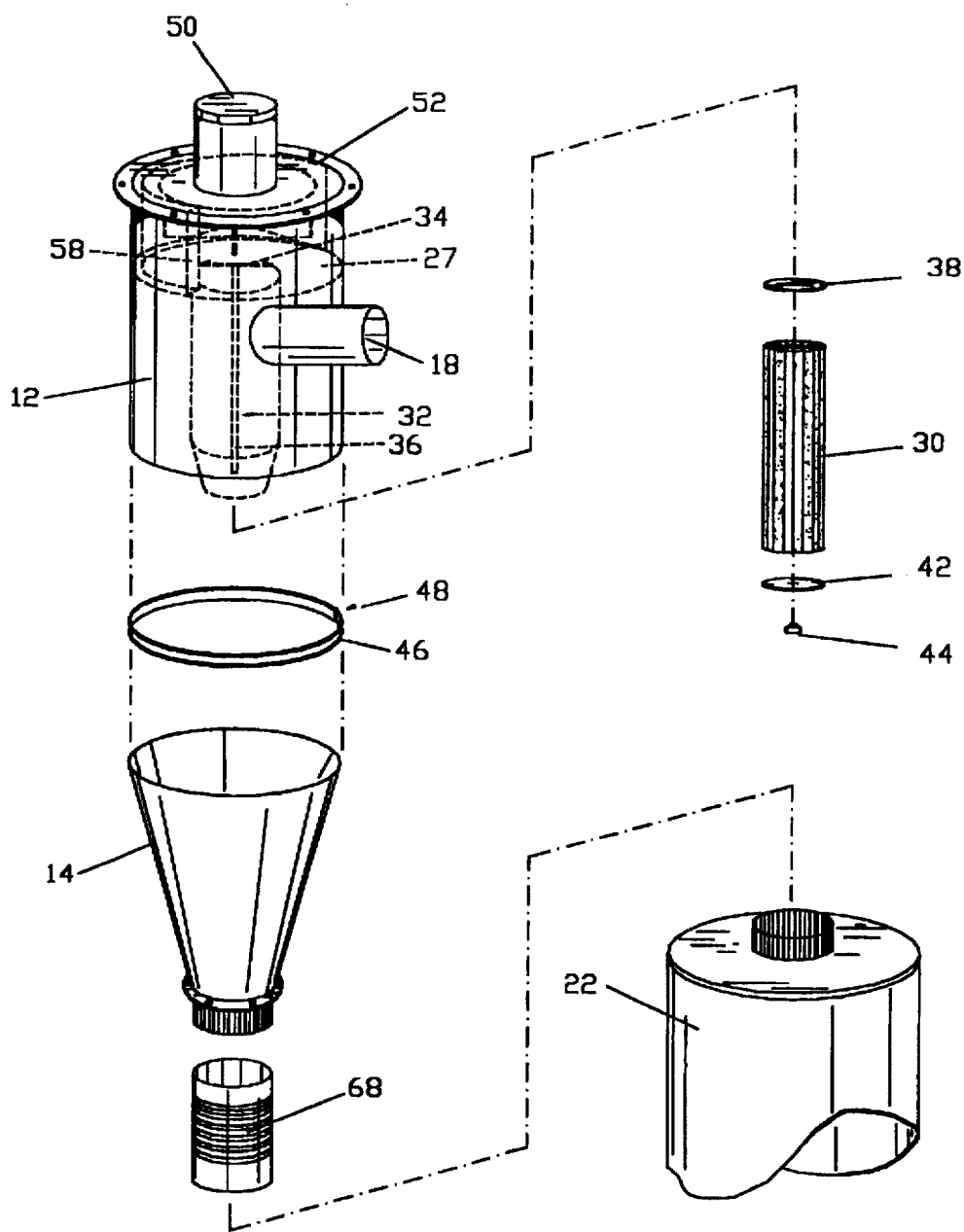
FIG. 2 is an exploded perspective thereof.
Figure 4:
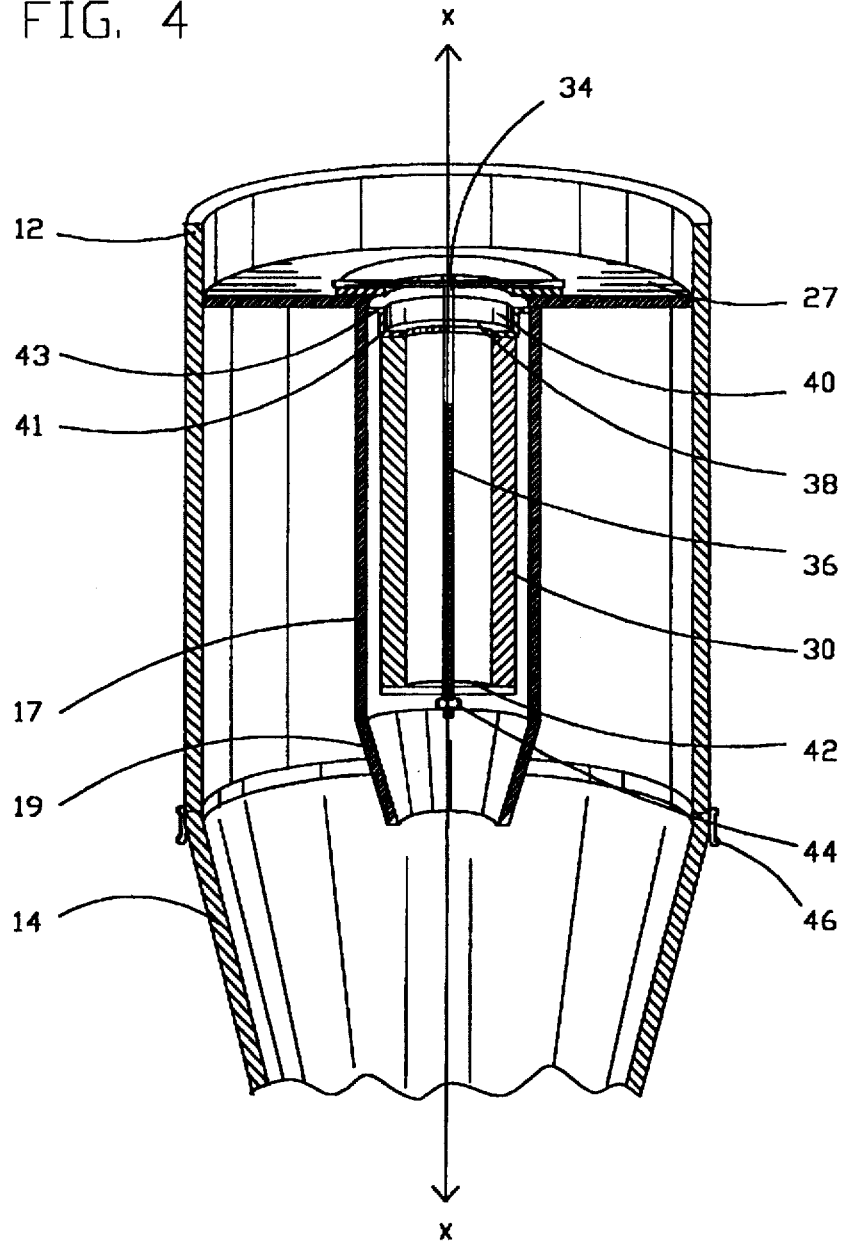
FIG. 4 is a cross-sectional view taken along line 4—4 of FIG. 1.
Figure 5:
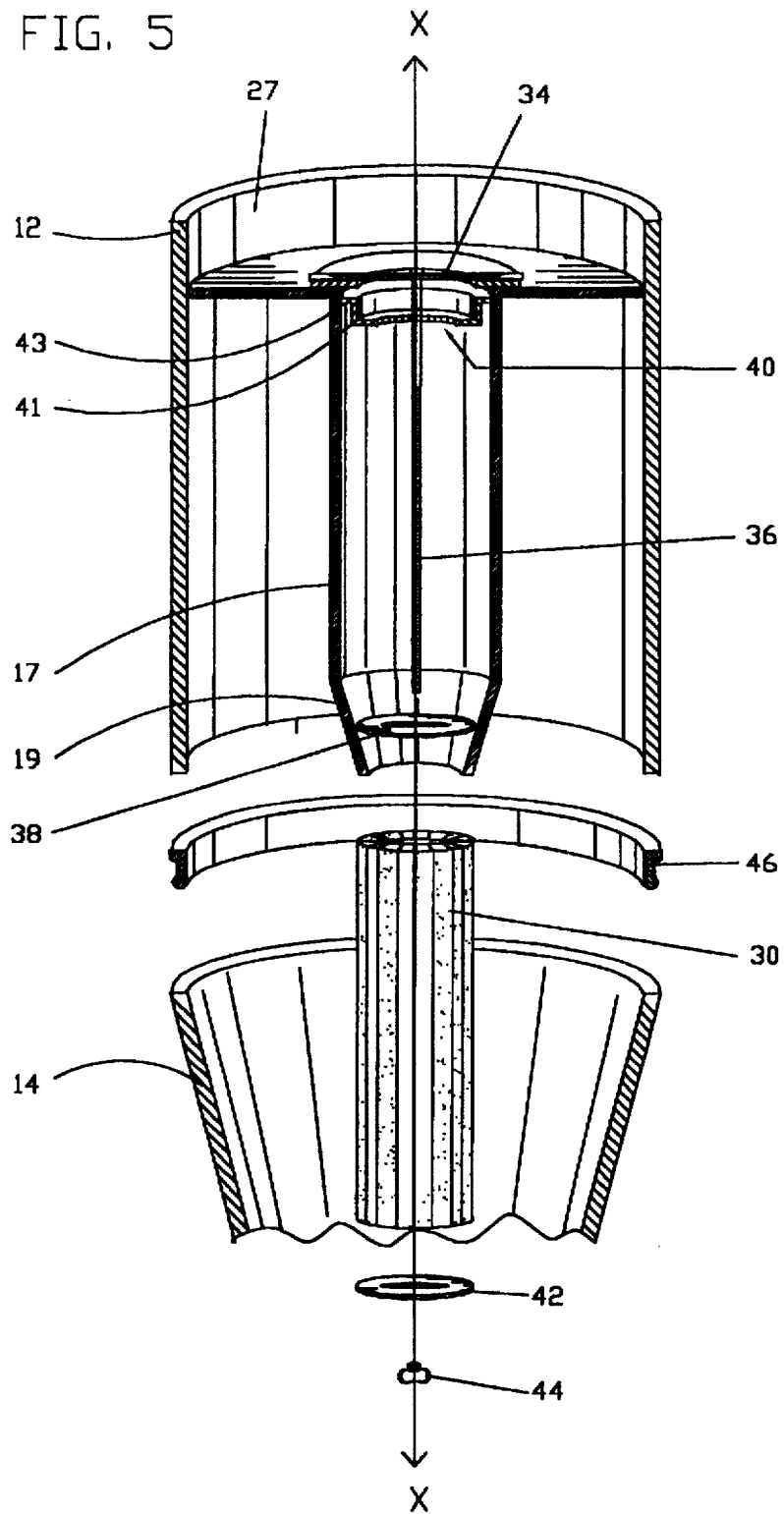
FIG. 5 is an exploded cross-sectional view thereof.

Referring now to the drawing figures wherein like reference numerals refer to like parts throughout, there is seen in FIG. 1 a cyclonic air filtration device (cyclone) denoted generally by reference numeral 10. Cyclone 10 is generally comprised of a cylindrical barrel 12, a cone 14 releasably attached to and extending downwardly from barrel 12, and a cartridge filter assembly, denoted generally by reference numeral 16, securely positioned within a vortex tube 17 which is positioned concentrically within barrel 12. Barrel 12, filter assembly 16 and vortex tube 17 include a common longitudinal axis X—X which extends centrally therethrough (see FIGS. 4 & 5). Inlet conduit 18 and outlet 20 provide the passageway for the debris laden air to be introduced into barrel 10 and clean air to exit therefrom, respectively. Also, cyclone 10 includes a 35 gallon receptacle 22 positioned in fluid communication with cone 14 for collecting the filtered particulate matter. Other volume receptacles would work equally as well.

Figure 3:
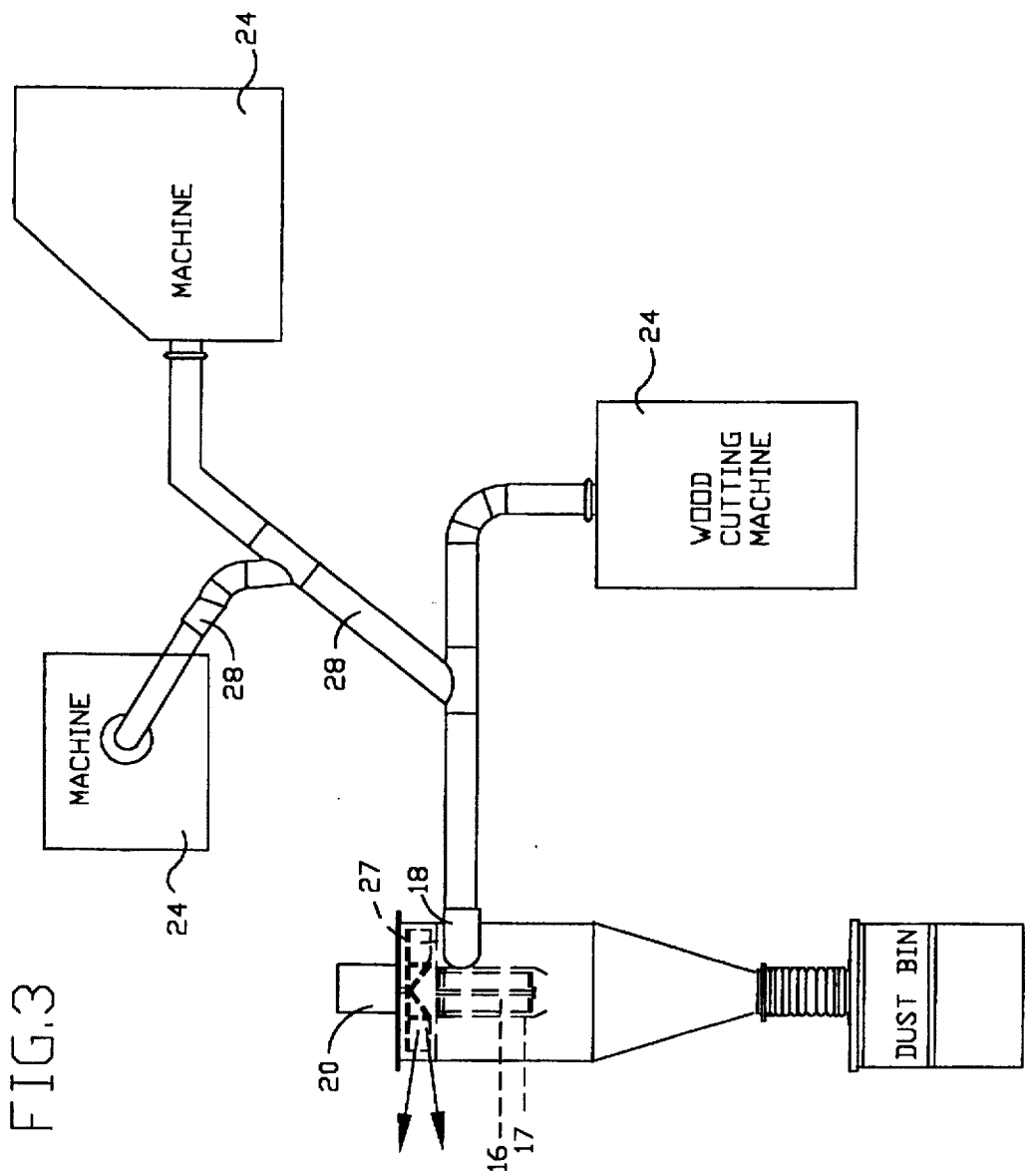
FIG. 3 is a schematic of the air cleaning system.

Cyclone 10 is intended to draw wood chips, or other particulate matter, directly from their source of origin, and convey them to a disposal receptacle, as is shown schematically in FIG. 3. Inlet conduit 18 extends between cyclone 10 and an area adjacent a wood cutting, or other debris producing machine 24. When machine 24 is operating, a high powered blower motor 26 positioned in fluid communication with barrel 10 is turned "on," thereby creating negative pressure in inlet conduit 18.

The negative pressure acts as a vacuum and draws all debris produced by machine 24 through inlet conduit 18 which then introduces the debris laden air tangentially into barrel 12. Once in barrel 12, the debris laden air is forced downwardly along the exterior of, and then upwardly into vortex tube 17. The air then passes through filter cartridge assembly 16 and all particles above a predetermined mesh size will be separated from the air.

A flange 27 extending radially outwardly from the top of vortex tube 17 ensures that all the debris laden air will pass into vortex tube 17 and through filter cartridge assembly 16, as will be explained hereinafter, before exiting through outlet 20. The debris either remains in filter cartridge assembly 16, or eventually falls through cone 14 and into receptacle 22. The filtered air rises through barrel 12, and into outlet 20 from where it is discharged into the open atmosphere.

It should be made clear that blower motor 26 could be positioned at the beginning of the system rather than at the end as illustrated, as the system would operate just as efficiently on positive pressure. Also, depending on the strength of fan 26, the debris produced from several machines 24 could be drawn into cyclone 10 via respective pipes 28 which eventually lead to inlet conduit 18.

For efficiency purposes vortex tube 17 includes an inwardly tapering cowl 19 integrally extending from its bottom end. Cowl 19 extends a predetermined distance below filter assembly 16 and tapers inwardly at a predetermined slope. A slope of about 0.214 has been found through trial and error to optimize filter life. Cowl 19 serves to break up the turbulence of the air entering into vortex tube 17 before it enters filter assembly 16. By breaking up the turbulence, premature filter clogging will be prevented. The disclosed geometry has resulted in a filter cleaning interval of over 500 hours of operation (with general saw dust).

After a predetermined amount of debris has been separated from the air, filter cartridge assembly 16 must be removed from vortex tube 17 in order to change the pleated filter 30. Assembly 16 is essentially comprised of a pleated filter 30 and the various elements which retain filter 30 securely in position within vortex tube 17. A T-bar 32 having a handle portion 34 which is welded to the upper surface of flange 27, and a threaded, shaft portion 36 extending downwardly from handle portion 34, is the main support element of assembly 16. Shaft portion 36 extends centrally through the open center of filter 30 along longitudinal axis X—X. A foam sealing ring 38 is positioned on shaft portion 36 adjacently between the upper end of filter 30 and an annular flanged bushing 40 is integrally positioned within vortex tube 17.

Bushing 40 includes a vertically oriented cylindrical portion 41 and a horizontally oriented flange portion 43, with respect to barrel 12, extending radially outwardly from the top of cylindrical portion 41. Flange portion 43 is fixedly secured to the inside wall of vortex tube 17. Sealing ring 38 firmly abuts cylindrical portion 41 when filter cartridge assembly 16 is in place. Further, bushing 40 and sealing ring 38 include central apertures formed therethrough which correspond in diameter and position with the central opening of filter 30. Also, flange portion 43 ensures that all air introduced into vortex tube 17 passes through filter 30 before exiting cyclone 10.

Filter assembly 16 further includes a bottom plate 42 which is integrally formed on the bottom of filter 30 (shown spaced from filter 30 in the drawings for illustrative purposes) through which shaft portion 36 passes. A wing nut 44 secures bottom plate 42, and thus filter 30, in vortex tube 17.

In order to change filter 30, cone 14 must first be separated from barrel 12. Cone 14 is attached to barrel 12 by a belt like clamp 46 which includes overlapping ends having apertures formed adjacently therethrough. When the apertures are aligned, a single screw 48 passes therethrough to retain clamp 46 in encircling relation to barrel 12 and cone 14. Therefore, to separate cone 14 from barrel 12, screw 48 must be removed. Once removed, clamp 46 will loosen, thereby causing cone 14 and barrel 12 to separate. Wing nut 44 is then accessible and may be removed from shaft portion 36. Once nut 44 is removed, filter 30 will fall out of vortex tube 17. A new filter 30 may then be placed into vortex tube 17 (permitting shaft portion 36 to pass centrally therethrough), and wing nut 44 may be tightened onto shaft portion 36 to secure the new filter 30 in position. Cone 14 may then be reattached to barrel 12 by placing clamp 46 in encircling relation to cone 14 and barrel 12, and tightening screw 48.

The present invention can be constructed with or without a power source. In the embodiment shown in the drawings, a motor 50 is centrally positioned on the exterior surface of cover 52 which is bolted to the top of barrel 12. The present invention uses a 1.5 Hp motor, but different power motors could be employed depending on the need of the user. Motor 50 is electrically connected to fan blades 54 which are annularly positioned in the upper portion 56 of barrel 12 above flange 27 (a lower portion within barrel 12 exists beneath flange 27). A predetermined distance (a little more than 3 inches in the preferred embodiment) separates the tip of blades 54 from the interior surface of barrel 12.

The clean air which enters upper portion 56 remains swirling in a clockwise direction even after passing through filter 30 (the tangential introduction of air into barrel 12 begins the air in a swirling motion). Therefore, if blades 54 move in a clockwise motion, they operate more efficiently as they do not have to overcome any oppositely directed forces (i.e., if the air was circulating counter-clockwise), or have to start stagnant air moving towards outlet assembly 20.

Figure 6:
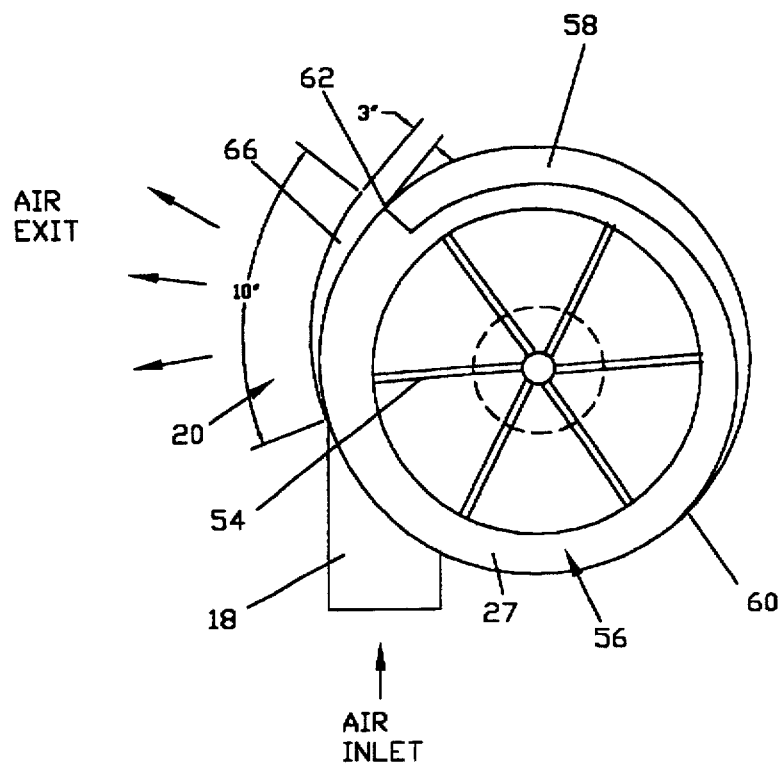
FIG. 6 is a top plan view of FIG. 1, with the cover removed.
Figure 7:
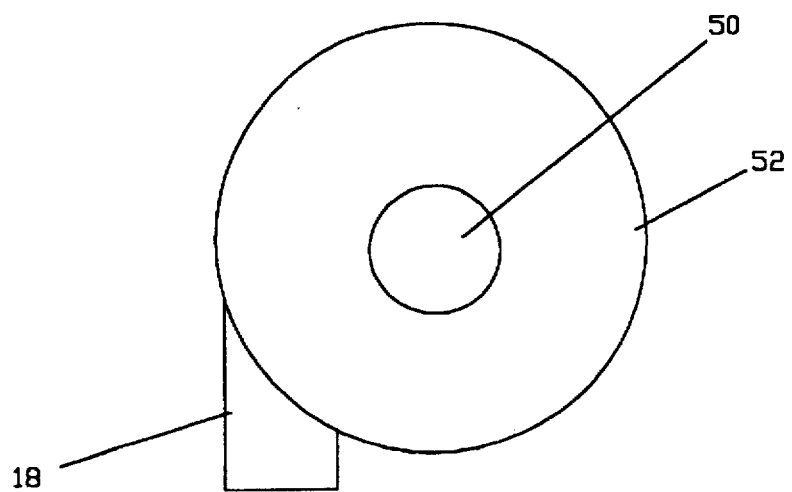
FIG. 7 is a top plan view of FIG. 1.
Figure 8:
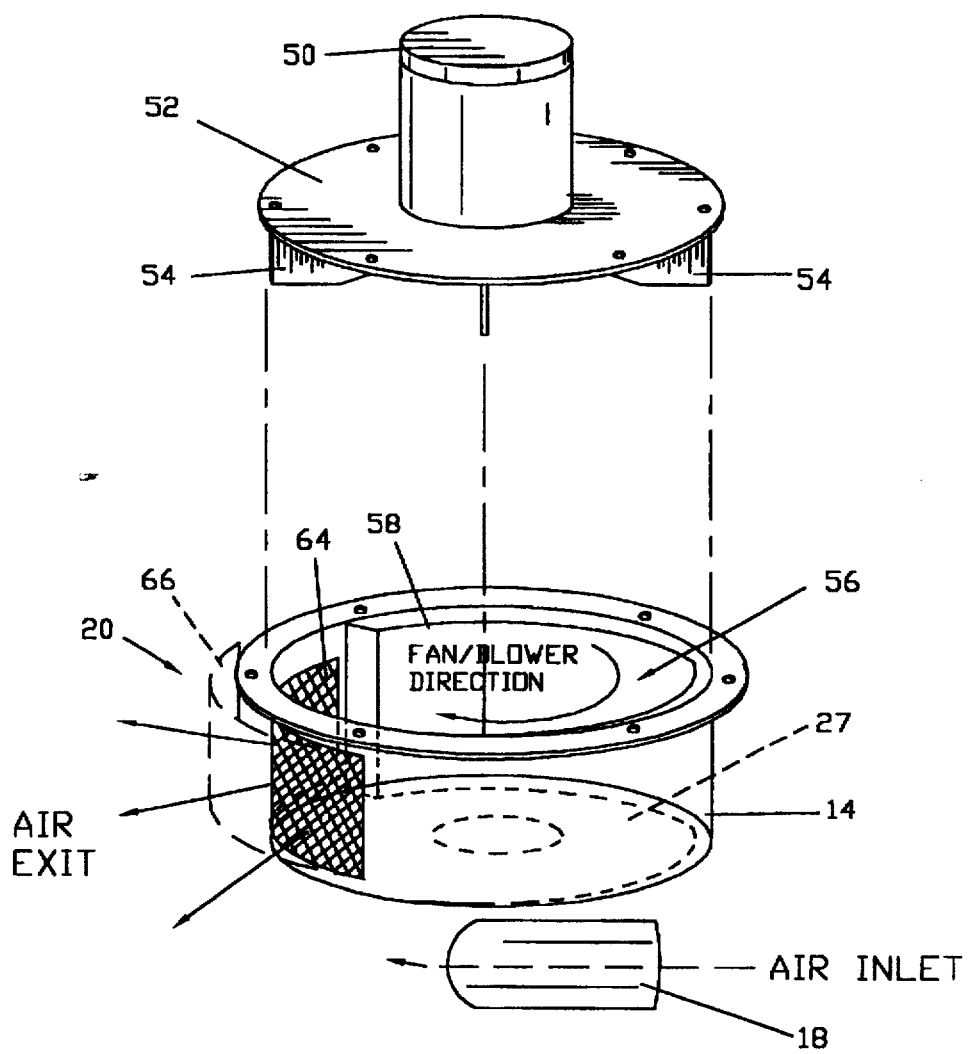
FIG. 8 is an exploded perspective view of the top of the present invention.

Once the air is moved into upper portion 56, blades 54 push the air through outlet assembly 20. Referring now to FIGS. 6 and 8, outlet 20 is seen to be comprised of an Archimedes scroll 58 which extends from a point 60 where it contacts barrel 12, to a point 62 where it is positioned a predetermined distance within barrel 12 (about 3 inches in the preferred embodiment). Point 60 is about 225 degrees from point 62, and scroll 58 progressively, uniformly tapers over that span from being in contact with barrel 12 to a predetermined distance (3 inches) away from the interior surface of barrel 12. Scroll 58 helps guide the air through its circular path out of barrel 12. Outlet assembly 20 further includes a metal grating 64 integrally positioned with upper portion 50 of barrel 12 in a portion of the 135 degrees of space not occupied by scroll 58. The air passes through grating 64 and is further guided into the open atmosphere by a deflecting vane 66 which extends adjacent grating 64, outside of barrel 12.

After the system has operated for a predetermined time, receptacle 22 will need to be emptied. Receptacle 22 is attached to cone 14 by a flex coupling 68 which can be either pressure fit or screwed to cone 14 and receptacle 22. In either case, the attachment between flex coupling 48 and receptacle 22 may be easily removed, and receptacle 22 emptied and then placed back into fluid communication with cone 14. Flex coupling 68 is expandable to permit the height of the entire system to be adjusted to conform with any mounting situation. The selective height adjustment makes the unit more attractive to a variety of users since cyclone cleaner 10 may be mounted in any desired fashion, in any room having a ceiling lower than the maximum expandable height.

What is claimed is:

1. A cyclonic air cleaning device comprising:
   a) a barrel portion having an inlet and an outlet, a first longitudinal axis extending centrally therethrough, and a top end substantially closed by a flange having a centrally positioned aperture formed therethrough, and an at least partially open bottom end defined by a continuous sidewall having a predetermined peripheral dimension;
   b) a blower means;
   c) an elongated vortex tube securely attached to and positioned concentrically within said barrel portion, said vortex tube including a first elongated section of a constant, first cross-sectional diameter, and a second portion integrally extending downwardly from said first elongated portion, said second portion tapering from said first cross-sectional diameter to a second cross-sectional diameter smaller than said first cross-sectional diameter;
   d) an elongated filter unit substantially concentrically positioned entirely within said first elongated section of said vortex tube, and having a central passage extending longitudinally therethrough, and an open top end and a lower end having a plate positioned in abutting relation thereto, said plate having a centrally positioned aperture extending therethrough;
   e) means for holding said filter unit within said barrel, said holding means comprising:
      i) an elongated member having opposite first and second ends and a second longitudinal axis which extends parallel to said first longitudinal axis; and
      ii) means for retaining said elongated member in fixed position with respect to said filter unit.

2. The invention according to claim 1 wherein said cyclonic air cleaning device further includes a cone portion removably attached to said bottom end of said barrel, said cone portion having an open top end of a first predetermined peripheral dimension substantially equal to said predetermined peripheral dimension of said barrel portion's sidewall, and an open bottom end of second predetermined peripheral dimension smaller than said first predetermined peripheral dimension, whereby said cone portion and barrel portion are in fluid communication with one another when in attached relation.

3. The invention according to claim 2 wherein said cone portion is removably attached to said barrel portion by a belt clamp, whereby said belt clamp is held in encircling and contacting relation to said cone portion and said barrel portion by means of a screw.

4. The invention according to claim 2 wherein said cone portion is shaped in the form of a funnel.

5. The invention according to claim 2 wherein said cyclonic air cleaning device further includes a debris collection receptacle removably attached to said bottom end of said cone portion, whereby debris falling from said barrel portion into said cone portion is deposited into said collection receptacle.

6. The invention according to claim 5 wherein said collection receptacle is removedly attached to said cone portion by a flex coupling which permits the height of said cyclone air cleaner to be selectively extendable between minimum and maximum heights.

7. A cyclonic air cleaning device comprising:
   a) a barrel portion having an inlet and an outlet, and a substantially closed top end and an at least partially open bottom end defined by a continuous sidewall having a predetermined peripheral dimension;
   b) a cone portion having an open top end of first predetermined peripheral dimension, and an open bottom end of second predetermined peripheral dimension smaller than said first predetermined peripheral dimension, said cone portion being removably attached to said barrel portion at the juncture of said barrel portion's bottom end and said cone portion's top end;
   c) means for removably attaching said cone portion to said barrel portion, said attaching means positioned in encircling, contacting relation to said cone and barrel portions;
   d) a debris collection receptacle mounted on a floor and being removably connected to, and positioned in fluid communication with said cone portion; and
   e) means for selectively adjusting the height of said cyclonic air cleaning device comprising a flex coupling interconnecting said debris collection receptacle to said cone portion, said flex coupling being selectively extendable between predetermined minimum and maximum lengths.

8. The invention according to claim 7 wherein said barrel portion further includes a cavitated interior having first and second compartments separated by an annular, rigid plate, said first and second compartments positioned adjacent said bottom and top ends of said barrel, respectively, wherein said inlet provides fluid communication into said first compartment, and said outlet provides fluid communication into said second compartment.

9. The invention according to claim 8 further comprising blower means which include fan blades concentrically positioned within said second compartment.

10. The invention according to claim 7 further including an elongated vortex tube securely attached to and positioned concentrically within said barrel portion, said vortex tube including a first elongated section of a constant, first cross-sectional diameter, and a second portion integrally extending downwardly from said first elongated portion, said second portion tapering from said first cross-sectional diameter to a second cross-sectional diameter smaller than said first cross-sectional diameter.

11. The invention according to claim 10 further including an elongated filter unit releasably, concentrically positioned within said vortex tube, said filter unit including a central passage extending longitudinally therethrough.

12. The invention according to claim 11 wherein said filter unit includes an open top and a bottom end having a plate positioned in abutting relation thereto, said plate having a centrally positioned aperture extending therethrough.

13. The invention according to claim 12 further including means for releasably holding said filter unit within said vortex tube.

14. The invention according to claim 13 wherein said holding means comprises:
   a) a T-shaped bar having a handle portion securely attached to said flange, extending radially outward from said vortex tube's top end, and a threaded shank portion integrally extending downwardly from said handle portion, said shank portion extending through said central passage formed through said filter unit, and through said central aperture formed through said plate; and
   b) a nut adapted to threadingly engage said shank portion, whereby when said nut is positioned in abutting relation to said plate, said nut prevents said filter unit from falling out of said barrel.

15. A cyclonic air cleaning device comprising:
   a) a cylindrical barrel portion having a continuous sidewall which defines top and bottom ends, and an inlet and an outlet;
   b) said barrel portion further having a cavitated interior which includes first and second compartments separated by an annular, rigid first plate having an aperture formed centrally therethrough, said first and second compartments positioned adjacent said bottom and top ends, respectively, wherein said inlet provides fluid communication into said first compartment, and said outlet provides fluid communication into said second compartment;
   c) an electrically powered blower having fan blades concentrically positioned within said barrel portions' second compartment; and
   d) a scroll shaped air guiding member positioned in encircling relation to said blower within said second compartment, wherein air brought into said second compartment by said blower is directed through said outlet by said air guiding member.

16. The invention according to claim 15 further comprising an elongated vortex tube securely attached to and positioned concentrically within said barrel portion, said vortex tube including a first elongated section of a constant, first cross-sectional diameter, and a second portion integrally extending downwardly from said first elongated portion, said second portion tapering from said first cross-sectional diameter to a second cross-sectional diameter smaller than said first cross-sectional diameter.

17. The invention according to claim 16 further comprising an elongated filter unit essentially concentrically positioned within said elongated vortex tube, and having a central passage extending therethrough, and an open top end and a lower end having a second plate positioned in abutting relation thereto, said second plate having a centrally positioned aperture extending therethrough.

18. The invention according to claim 17 further comprising means for holding said filter unit within said vortex tube.

19. The invention according to claim 18 wherein said holding means comprises:
   a) a T-shaped bar having a handle portion securely attached to said first plate and a threaded shank portion integrally extending downwardly from said handle portion, said shank portion extending through said aperture formed through said first plate, through said central passage formed through said filter unit, and through said aperture formed through said second plate; and
   b) a nut adapted to threadingly engage said shank portion, whereby when said nut is positioned in abutting relation to said second plate it prevents said filter unit from falling out of said barrel.

20. The invention according to claim 1 wherein said elongated member is a threaded T-shaped bar having a handle portion securely attached to said flange and a threaded shank portion integrally extending downwardly from said handle portion, said shank portion extending through said aperture formed through said flange, through said central passage formed through said filter unit, and through said aperture formed through said plate.

21. The invention according to claim 20 wherein said retaining means is a nut adapted to threadingly engage said shank portion, whereby when said nut is positioned in abutting relation to said plate on said bottom of said filter unit, said nut prevents said filter unit from falling out of said barrel.

22. The invention according to claim 7 wherein said clamp means is comprised of:
   a) a belt clamp having first and second overlapping ends which include first and second apertures, respectively, formed adjacently therethrough, and adaptively formed to be positioned in encircling, contacting relation to said cone portion and said barrel portion when said cone portion is attached to said barrel portion; and
   b) a release screw adaptively formed to pass through said first and second apertures to hold said belt clamp in secure, encircling relation to said barrel portion and said cone portion, whereby removal of said release screw causes said belt clamp to become detached from said barrel portion and said cone portion, thereby separating said cone portion from said barrel portion.

23. A method for changing the filter of a cyclonic air cleaning device having a cylindrical barrel portion having a top end substantially closed by a flange having a centrally positioned aperture formed therethrough, and an at least partially open bottom end, said cyclonic air cleaning device further having a cone portion removably attached to said bottom end of said barrel portion, and an elongated vortex tube having top and bottom ends and being securely, concentrically positioned within said barrel portion, said filter being concentrically positioned within said vortex tube and removably mounted to said barrel portion by retaining means, said method for changing said filter comprising the steps of:
   a) detaching said cone portion from said barrel portion, thereby exposing said at least partially open bottom end of said barrel portion;
   b) removing the retaining means which mount said filter to said barrel portion, thereby permitting said filter to be freely removed through said bottom of said vortex tube and said barrel portion;

c) placing a new filter through said bottom of said vortex tube until it is concentrically, entirely positioned within said vortex tube;

d) affixing said retaining means to securely mount said new filter in said vortex tube and barrel portion; and e) attaching said cone portion to said bottom of said barrel portion.

24. The method of changing said filter of claim 23, wherein said filter includes a central passageway extending longitudinally therethrough, and an open top end and a lower end having a plate positioned in abutting relation thereto, said plate having a centrally positioned aperture extending therethrough.

25. The method of changing said filter of claim 24, wherein said means for retaining said filter concentrically within said barrel portion is comprised of:

a) a T-shaped bar having a handle portion securely attached to said flange and an elongated, threaded shank portion integrally extending downwardly from said handle portion, said shank portion extending through said aperture formed through said flange, through said central passageway formed through said filter, and through said aperture formed through said plate; and b) a nut threadingly engaged with said shank portion and positioned in abutting relation to said plate, thereby maintaining said plate in abutting relation to said bottom of said filter.

* * * * *